US012771287B2

(12) United States Patent
Huang et al.

(10) Patent No.: US 12,771,287 B2
(45) Date of Patent: Oct. 20, 2026

(54) INTEGRATED STRUCTURE OF STEEL FRAME ASSEMBLY AND STEEL SUPPORT FOR SOLAR PHOTOVOLTAIC POWER STATION AND ASSEMBLING METHOD THEREFOR

(71) Applicant: Anhui Caesar New Energy Technology Co., Ltd., Chuzhou (CN)

(72) Inventors: Xiaofeng Huang, Chuzhou (CN); Hui Huang, Chuzhou (CN); Siping Xie, Chuzhou (CN)

(73) Assignee: Anhui Caesar New Energy Co., Ltd., Chuzhou (CN)

( * ) Notice: Subject to any disclaimer, the term of this patent is extended or adjusted under 35 U.S.C. 154(b) by 236 days.

(21) Appl. No.: 18/626,340

(22) Filed: Apr. 4, 2024

(65) Prior Publication Data

US 2025/0132718 A1 Apr. 24, 2025

(30) Foreign Application Priority Data

Oct. 19, 2023 (CN) ......................... 202311356010.4
Dec. 29, 2023 (CN) ......................... 202311856670.9

(51) Int. Cl.
*F16B 5/12* (2006.01)
*H02S 30/10* (2014.01)

(52) U.S. Cl.
CPC .............. *H02S 30/10* (2014.12); *F16B 5/121* (2013.01)

(58) Field of Classification Search
CPC ................................. H02S 30/10; F16B 5/121
See application file for complete search history.

(56) References Cited

U.S. PATENT DOCUMENTS

| | | | | |
|---|---|---|---|---|
| 8,701,361 | B2 * | 4/2014 | Ferrara | H02S 30/10 126/621 |
| 11,245,356 | B1 * | 2/2022 | Hsueh | H02S 30/00 |
| 2021/0239365 | A1 * | 8/2021 | Powers, III | F24S 25/12 |
| 2022/0006421 | A1 * | 1/2022 | Annibale | H02S 20/00 |
| 2022/0103117 | A1 * | 3/2022 | Gong | H02S 30/10 |
| 2022/0407451 | A1 * | 12/2022 | Jacobs | H02S 20/20 |
| 2023/0029089 | A1 * | 1/2023 | Gopalagowda | E04D 1/2918 |
| 2023/0139726 | A1 * | 5/2023 | Boguess | F24S 25/617 136/246 |

(Continued)

FOREIGN PATENT DOCUMENTS

CN 220254436 U * 12/2023

*Primary Examiner* — Patrick J Maestri
(74) *Attorney, Agent, or Firm* — Proi Intellectual Property US

(57) ABSTRACT

The disclosure relates to an integrated structure of a steel frame assembly and a steel support for a solar photovoltaic power station, including long-side steel frames, short-side steel frames, angle codes and purlines that fit with each other, where the long-side steel frames and the short-side steel frames are separately connected with two perpendicular portions of the angle codes to form steel frame assemblies, connecting portions thereof are of the same structures, and the steel frame assemblies are connected with the purlines again, steel frames located at the lowermost positions of the steel frame assemblies are set as steel frames I without sides A, the remaining steel frames are all steel sides II with sides A, and the steel frame assemblies are connected with the purlines in a back locking or pressing block fixation manner.

4 Claims, 28 Drawing Sheets

(56) References Cited

U.S. PATENT DOCUMENTS

| | | | | |
|---|---|---|---|---|
| 2023/0188087 | A1* | 6/2023 | Jürimäe | H02S 30/00 136/243 |
| 2024/0186944 | A1* | 6/2024 | Hafter | F16B 5/121 |
| 2024/0186945 | A1* | 6/2024 | Patton | F24S 25/63 |
| 2024/0258964 | A1* | 8/2024 | Hafter | H02S 30/10 |
| 2024/0297614 | A1* | 9/2024 | Hafter | F24S 25/20 |
| 2025/0309814 | A1* | 10/2025 | DeFresart | H02S 20/20 |
| 2025/0343502 | A1* | 11/2025 | Lin | H02S 30/10 |

* cited by examiner

INTEGRATED STRUCTURE OF STEEL FRAME ASSEMBLY AND STEEL SUPPORT FOR SOLAR PHOTOVOLTAIC POWER STATION AND ASSEMBLING METHOD THEREFOR

TECHNICAL FIELD

The present disclosure relates to the technical field of solar photovoltaic equipment, and in particular to an integrated structure of a steel frame assembly and a steel support for a solar photovoltaic power station and an assembling method therefor.

BACKGROUND

The traditional connection for aluminum frames and angle codes mainly relies on the friction of the upper teeth of the angle codes and the aluminum frames, can bear a less pulling force, and will destroy anodic oxide layers on inner walls of the aluminum frames when being pulled. Traditional frames are connected with purlines by adopting a mounting mode for ordinary hexagon bolts, and mounting structures thereof are unstable and easy to loose and fall. To overcome this defect, a mode for connecting riveting points by adopting the steel frames through the angle codes appears on the market, for example, the Chinese patent No. CN115473484A discloses a steel frame assembly for a solar photovoltaic power station and a manufacturing and assembling method therefor, the steel frame assembly includes long-side steel frames, short-side steel frames, angle codes and elastic fixture blocks, and the long-side steel frames and the short-side steel frames are frame structures with S-shaped cross sections and 45 degrees of dip angles. In this existing patent, the long sides and the short sides of the steel frame are connected through the angle codes, with a connecting mode of the riveting point connection, after being mounted, the steel frame is firm and reliable, can bear the strong pulling force, is quick and convenient in connection, and suitable for mass rapid assembly, to improve the production efficiency greatly.

However, all the four frames of a photovoltaic module assembled by this steel frame have sides A, after the photovoltaic module is mounted, dust usually accumulates on a surface of the photovoltaic module since the bottom frame is blocked by the sides A, and the dust is not easily washed by rain. The accumulated dust will block or weaken an incident ray, such that a photoelectric effect of the photovoltaic module is weakened, resulting in the reduction of the power generation capacity of the photovoltaic module, the induction of hot spots, the temperature rise of the photovoltaic module and the reduction of the battery life.

In addition, when this photovoltaic module is in fit assembly with the traditional purline, both the horizontal row and the vertical row exist the problem that the photovoltaic module is easy to slide, upper, lower, left and right positioning devices are unavailable during assembly, so the cooperation of bolts and hole sites is also difficult when the bolts are locked, which undoubtedly prolongs the mounting time and slows down the working progress, and the connection strength between the steel frame and the purline is also weakened greatly, which is not conductive to the normal use of the photovoltaic power station.

SUMMARY

The objective of the present disclosure is to provide an integrated structure of a steel frame assembly and a steel support for a solar photovoltaic power station, to solve the problem that the existing steel frame is easy to accumulate dust, has a photovoltaic module easy to slide, and has a low mounting efficiency and a poor connection effect, and the steel frame support for the solar photovoltaic power station may reduce the phenomenon of dust accumulation of the photovoltaic module, improve the power generation capacity thereof, achieve the accurate positioning of a steel frame assembly, effectively prevent the steel frame assembly from sliding due to the dead load, reduce the labor intensities of mounting personnel and greatly improve the mounting efficiency.

To implement the above objective, the present disclosure adopts the technical solution below:

An integrated structure of a steel frame assembly and a steel support for a solar photovoltaic power station, including long-side steel frames, short-side steel frames, angle codes and purlines that fit with each other, where the long-side steel frames and the short-side steel frames are separately connected with two perpendicular portions of the angle codes to form steel frame assemblies, connecting portions thereof are of the same structures, and the steel frame assemblies are connected with the purlines again.

Steel frames located at the lowermost positions of the steel frame assemblies are set as steel frames I without sides A, the remaining steel frames are all steel sides II with sides A, and the steel frame assemblies are connected with the purlines in a back locking or pressing block fixation manner.

Further, the steel frames I include frames constituting a lower-end cavity I and a vertical extension edge at an upper part thereof, a zero-gap folding edge I is arranged on the vertical extension edge, a laminating piece is arranged at an L-shaped mounting position formed by one side of the vertical extension edge and the lower-end cavity I, the vertical extension edge is as high as the laminating piece, an upper frame inside the lower-end cavity I is provided with an anti-rotating bump I, and a lower frame inside the lower-end cavity I is provided with D-shaped riveting points I.

Further, cross sections of the steel frames II are S-shaped, the steel frames II include frames constituting an upper-end cavity and a lower-end cavity II, a side-A frame at the upper part of the upper-end cavity is provided with a zero-gap folding edge II, an upper frame inside the lower-end cavity II is provided with an anti-rotating bump II, and a lower frame inside the lower-end cavity II is provided with D-shaped riveting points II.

Further, a junction of the frame where the upper-end cavity is located and the frame where the lower-end cavity II is located is provided with a glue overflow groove edge adopting a chamfer structure design, and a circular arc structure design is adopted between the folding edge I and the vertical extension edge as well as between the folding edge II and the side-A frame.

Further, D-shaped holes and anti-rotating bump slots are formed in the angle codes, the D-shaped holes are in mutual fit and fixed connection with the D-shaped riveting points I or the D-shaped riveting points II in respective while the anti-rotating bump slots are in mutual fit and fixed connection with the anti-rotating bump I or the anti-rotating bump II in respective, the angle codes are also provided with angle protectors on which chamfers are arranged, both sides of the angle codes are provided with guide folding edges I with rounded corners, a guide slot recession is arranged between the angle codes that are located on a same side and vertically connected up and down, rounded corners are punched on circular arc edges of the D-shaped holes, such that the D-shaped riveting points can enter the D-shaped holes of the angle codes smoothly and the riveting points fit with the angle codes tightly.

Further, the purlines are U-shaped purlines, both sides of upper parts of the U-shaped purlines are separately provided with horizontal bending portions, vertical flanges are connected outside the horizontal bending portions on each side, the vertical flanges and the horizontal bending portions form an L-shaped structure that is set to be parallel to axes of the U-shaped purlines, mounting holes are formed in the horizontal bending portions, grooves are formed in the flanges, limiting gaps are arranged on the flanges, upper parts of the flanges are also provided with guide folding edges II that bend outwards, when the steel frame assemblies are in connection fit with the purlines, facades of the steel frame assemblies are provided with bosses fitting with the grooves, the bosses are just embedded into the grooves, and the steel frame assemblies are clamped at the limiting gaps to limit the displacement of the steel frame photovoltaic module and to ensure the steel frame photovoltaic module not to fall easily.

To further complete the objective of the present disclosure, an assembling method for the integrated structure of the steel frame assembly and the steel support for the solar photovoltaic power station is also provided, including a horizontal row mounting method and a vertical row mounting method, with the specific steps as follows:

S1, the horizontal row mounting method includes:

S11: Mounting a photovoltaic support foundation based on a north-south span and a west-east span between foundations on a design drawing;

S12: Setting up columns, inclined beams and inclined struts on the photovoltaic support foundation, and performing a height regulation on the columns in a ground pile, whereby upper surfaces of the inclined beams are located on a same horizontal plane;

S13: Mounting inclined cross adjustable pull rods between the inclined beams and between the columns;

S14: Transversely setting up U-shaped purlines on the inclined beams, to ensure the space between the purlines, and connecting the purlines through purline connectors when an array is relatively long;

S15: Lifting, by constructors, a steel frame photovoltaic module to a designated position above the U-shaped purlines, or absorbing, by a robot, outer frames of steel frame assemblies through an electromagnetic chuck, and lifting to the designated position above the U-shaped purlines;

S16: Pressing the steel frame photovoltaic module forcibly, clamping bosses on facades of the steel frame assemblies into grooves in the U-shaped purlines until a bottom surface of the steel frame photovoltaic module fits with upper surfaces of the U-shaped purlines, and locking the steel frame assemblies with bolts when there are no bumps;

S17: Repeating the above step S16, mounting the remaining steel frame photovoltaic modules on the U-shaped purlines, and completing the mounting; S2, the vertical row mounting method includes:

S21: Mounting a photovoltaic support foundation based on a north-south span and a west-east span between foundations on a design drawing;

S22: Setting up columns, inclined beams and inclined struts on the photovoltaic support foundation, and performing a height regulation on the columns in a ground pile, whereby upper surfaces of the inclined beams are located on a same horizontal plane;

S23: Mounting inclined cross adjustable pull rods between the inclined beams and between the columns;

S24: Setting up two beams on the inclined beams, and connecting the beams through a beam connector when an array is relatively long;

S25: Vertically setting up the U-shaped purlines above the beams, to ensure the space between the U-shaped purlines;

S26: Lifting, by constructors, a steel frame photovoltaic module to a designated position above the U-shaped purlines, or absorbing, by a robot, outer frames of steel frame assemblies through an electromagnetic chuck, and lifting to the designated position above the U-shaped purlines;

S27: Pressing the steel frame photovoltaic module forcibly, clamping bumps on facades of the steel frame assemblies into grooves in the U-shaped purlines until a bottom surface of the steel frame photovoltaic module fits with upper surfaces of the U-shaped purlines, and locking the steel frame assemblies with bolts when there are no bumps;

S28: Repeating the above step S27, mounting the remaining steel frame photovoltaic modules on the U-shaped purlines, and completing the mounting.

Further, in steps S16 and S27, the connecting mode for the steel frame photovoltaic modules and the U-shaped purlines includes a bolt connection, a buckle type connection and a bolt+buckle connection:

a) If the facades of the steel frame assemblies have ribs, the bolt connection is adopted; the upper parts of the U-shaped purlines are tapped, elastic pressing blocks are provided in the mounting cavities of the steel frame assemblies, such that flat gaskets and elastic gaskets are integrated on the bolts without falling, and then the steel frame assemblies are locked with the U-shaped purlines;

b) If the facades of the steel frame assemblies have no ribs, the buckle type connection is adopted; the bosses are punched on the facades of the steel frame assemblies, the grooves are punched on the flanges of the U-shaped purlines, and during mounting, the bosses on the steel frame assemblies enter the grooves of the U-shaped purlines, to achieve the bolt-free connection; and c) The double-connection guarantee of the steel frame photovoltaic modules and the U-shaped purlines is achieved by combining modes a and b.

Further, in step S16, a horizontal row mounting structure for the steel frame photovoltaic modules specifically includes:

S161, setting up the U-shaped purlines on the inclined beams, and transversely mounting the steel frame photovoltaic modules on the U-shaped purlines;

S162, limiting, by the flanges on the upper and lower U-shaped purlines, the movement of the steel frame assemblies in a y-axis direction, that is, the short-side direction;

S163, punching the gaps at the interference of the flanges of the U-shaped purlines and the steel frame assemblies, and limiting, by the gaps, the movement of the steel frame assemblies in an x-axis direction, that is, the long-side direction; and

S164, punching the grooves on the flanges of the U-shaped purlines, punching the bosses inside the facades of the steel frame assemblies, the bosses entering the grooves after the steel frame assemblies are mounted, to limit the movement of the steel frame assemblies in a z-axis direction, that is, the direction perpendicular to the steel frame photovoltaic modules.

Further, in step S27, a vertical row mounting structure for the steel frame photovoltaic modules specifically includes:

S271, setting up the beams on the inclined beams, setting up the U-shaped purlines on the beams, and vertically mounting the steel frame photovoltaic modules on the U-shaped purlines;

S272, limiting, by the flanges on the left and right U-shaped purlines, the movement of the steel frame assemblies in an x-axis direction, that is, the short-side direction;

S273, punching the gaps at the interference of the flanges of the U-shaped purlines and the steel frame assemblies, and limiting, by the gaps, the movement of the steel frame assemblies in a y-axis direction, that is, the long-side direction; and

S274, punching the grooves on the flanges of the U-shaped purlines, punching the bosses inside the facades of the steel frame assemblies, the bosses entering the grooves after the steel frame assemblies are mounted, to limit the movement of the steel frame assemblies in a z-axis direction, that is, the direction perpendicular to the steel frame photovoltaic modules.

In the present disclosure, the steel frame photovoltaic modules include the steel frame assemblies provided with the laminating plates and other photovoltaic accessories, and the assembly and connection with the purlines may be essentially regarded as the assembly and connection of the steel frame assemblies and the purlines.

Compared with the prior art, the technical solution of the present disclosure has the specific advantages below:

(1) In the present disclosure, the steel frame structure without the side-A structure design is adopted to reduce the dust accumulation situation of the photovoltaic modules, and the power generation capacity of the photovoltaic modules is greatly improved;

(2) In the present disclosure, the D-shaped riveting points are punched on both ends of the steel frame in a punching manner, the D-shaped holes are punched on both ends of the angle codes in a punching manner, during connection, the riveting points on the steel frames are only pressed into the holes of the angle codes, after being mounted, the steel frames are firm and reliable, can bear the strong pulling force, are quick and convenient in connection, and suitable for mass rapid assembly, to improve the production efficiency greatly;

(3) In the present disclosure, the anti-rotating strip buckle design is adopted above the steel frames and the angle codes, the strip bumps are circular smooth along the mounting direction of the angle codes, and the face preventing overturning is vertical, to ensure the convenient mounting while effectively preventing the angle codes turning over;

(4) In the present disclosure, the guide folding edges with the rounded corners are arranged on both sides of the angle codes, the end part of the guide slot adopts a recessing manner, the chamfer at the angle protector of the angle codes and other designs ensure that the angle codes can be smoothly placed in the steel frame cavity, to effectively reduce the mounting precision, not easily occur plate blasting, and improve the mounting efficiency and the error-tolerant rate;

(5) In the present disclosure, the purlines are U-shaped and opened upwards, two planes are used for carrying the steel frame assemblies, two guide folding edges are used for limiting the steel frames and can be slotted, this solution for the steel frames can be used for both the horizontal row and the vertical row, the connection mode for the steel frame photovoltaic modules and the U-shaped purlines includes the bolt connection, the buckle type connection and the bolt+buckle connection, the mounting mode is not only suitable for artificial mounting, but also suitable for the robot automatic mounting, and the mounting efficiency and intelligent level are improved; and (6) In the present disclosure, the support mounting solution can achieve the accurate positioning for the steel frame assemblies, to effectively prevent the steel frame assemblies from sliding due to dead load, avoid the phenomenon that the steel frame assemblies are blown off in a working condition against the wind, reduce the labor intensity of mounting personnel, and greatly improve the mounting efficiency.

DETAILED DESCRIPTION OF THE EMBODIMENTS

Embodiment 1

To make the present disclosure clearer, an integrated structure of a steel frame assembly and a steel support for a solar photovoltaic power station and an assembling method therefor provided by the present disclosure are further described below in combination with drawings, and the specific embodiments described herein are merely used for explaining the present disclosure instead of limiting the present disclosure.

Figure 1:
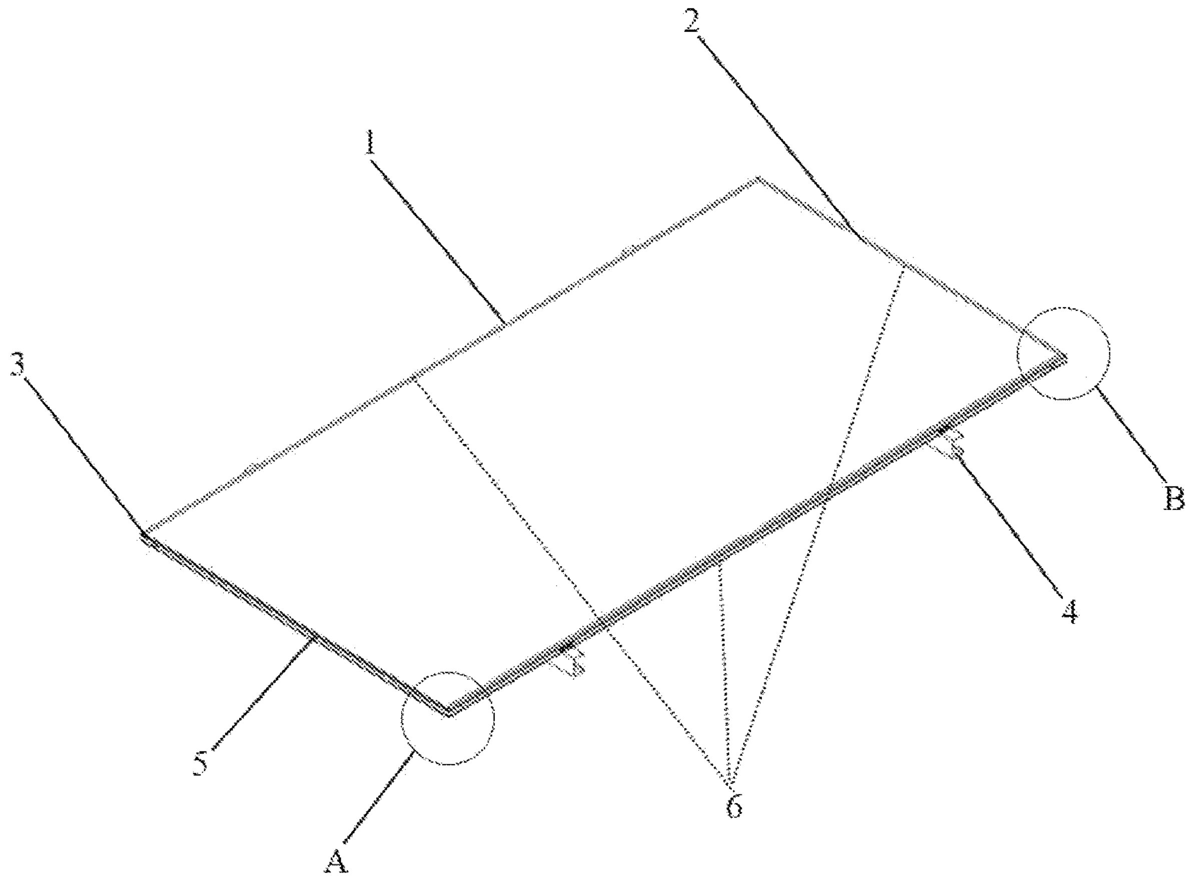
FIG. 1 is an overall structure diagram for a steel frame assembly of a steel frame support for a solar photovoltaic power station in the present disclosure.
Figure 2:
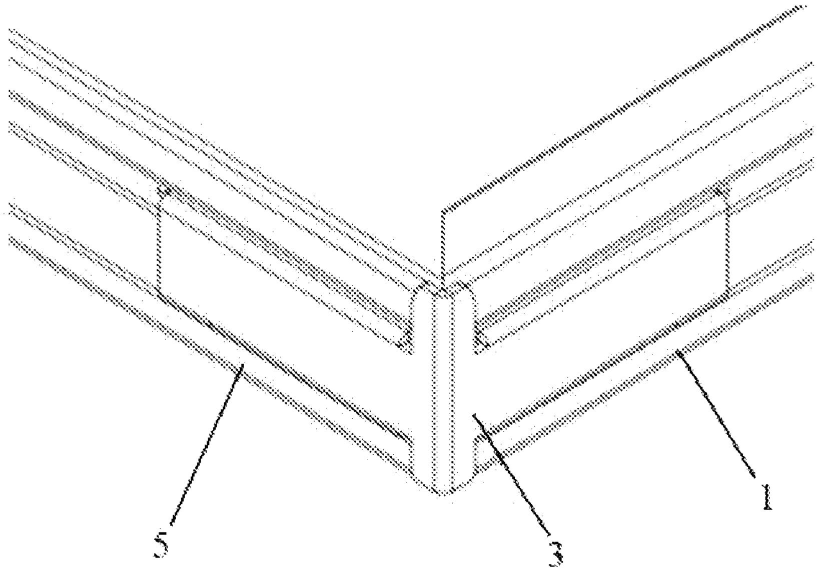
FIG. 2 is a local enlarged diagram of A in FIG. 1.
Figure 3:
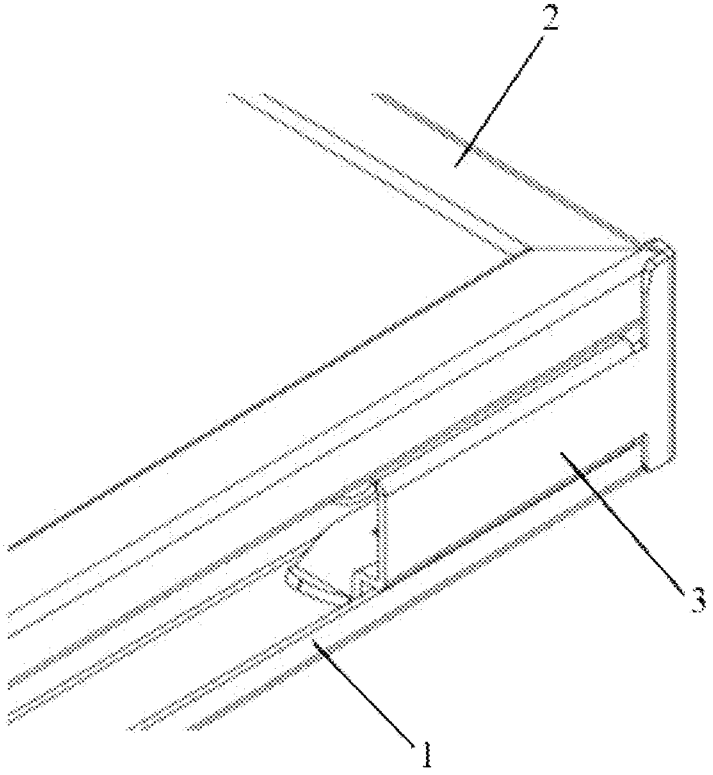
FIG. 3 is a local enlarged diagram of B in FIG. 1.
Figure 4:
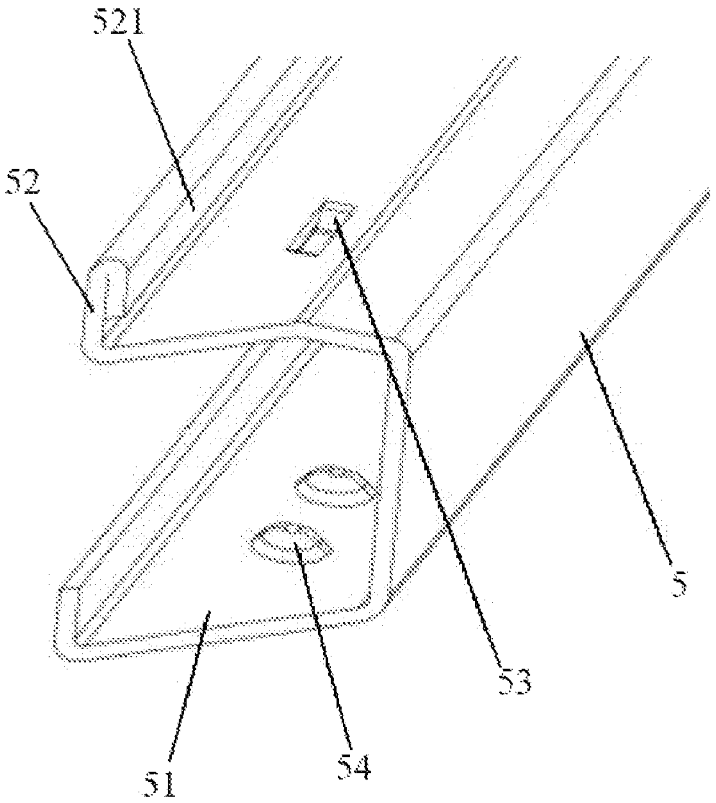
FIG. 4 is a solid structure diagram of a steel frame I in the present disclosure.
Figure 5:
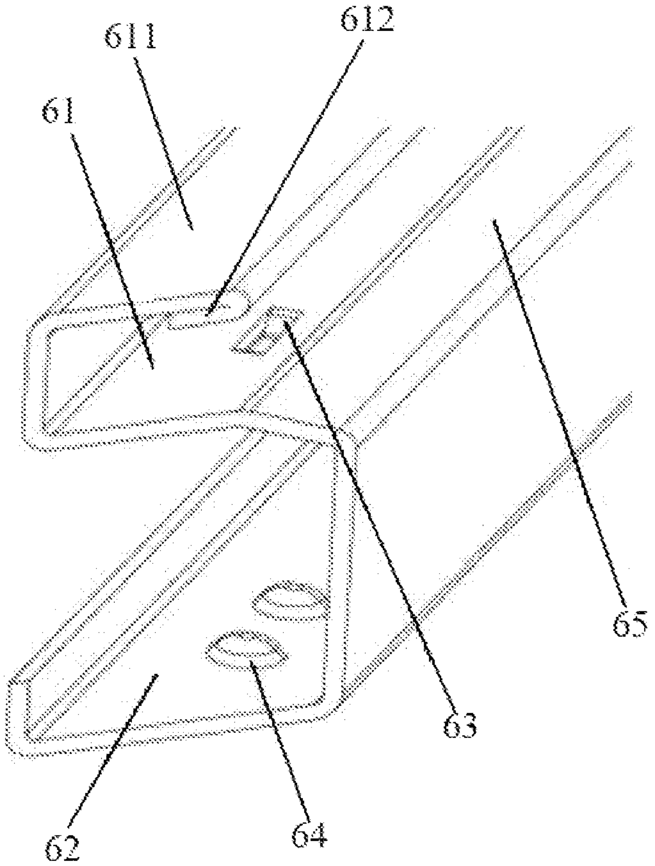
FIG. 5 is a solid structure diagram of a steel frame II in the present disclosure.
Figure 6:
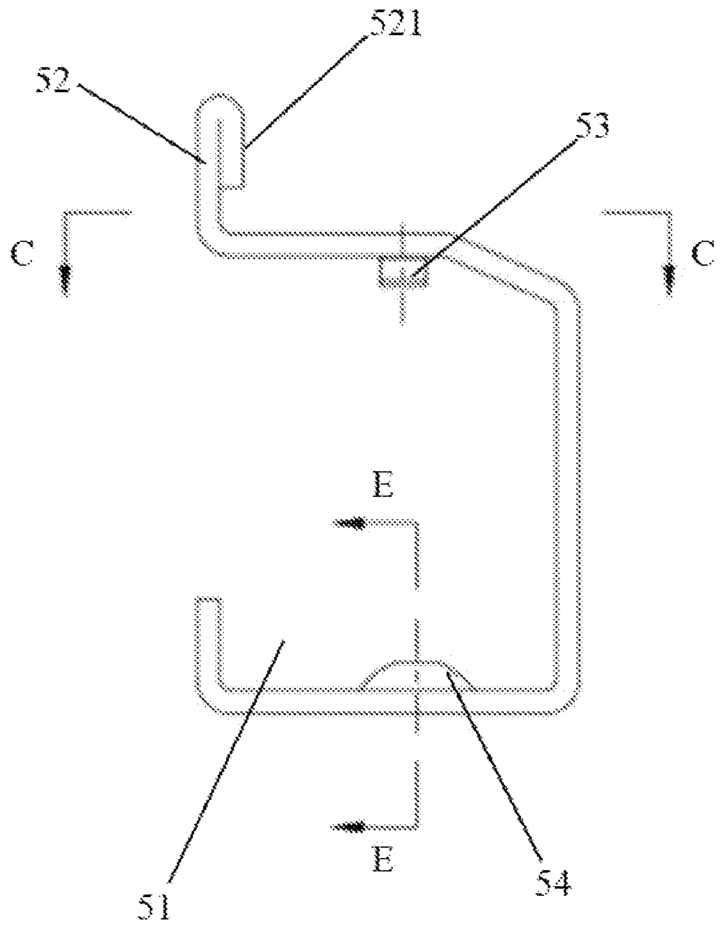
FIG. 6 is a front view of a steel frame I in the present disclosure.
Figure 7:
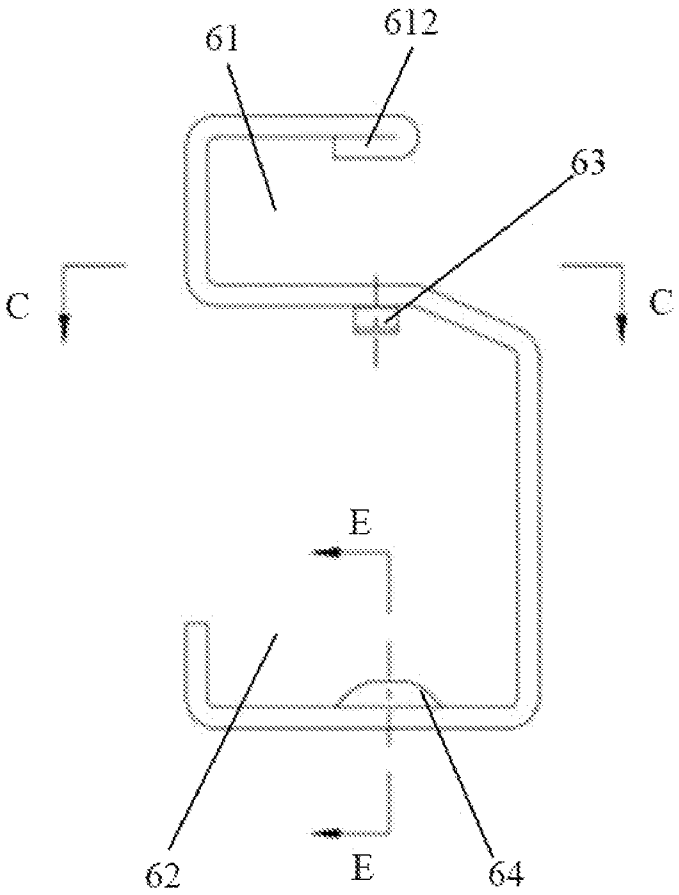
FIG. 7 is a front view of a steel frame II in the present disclosure.
Figure 8:
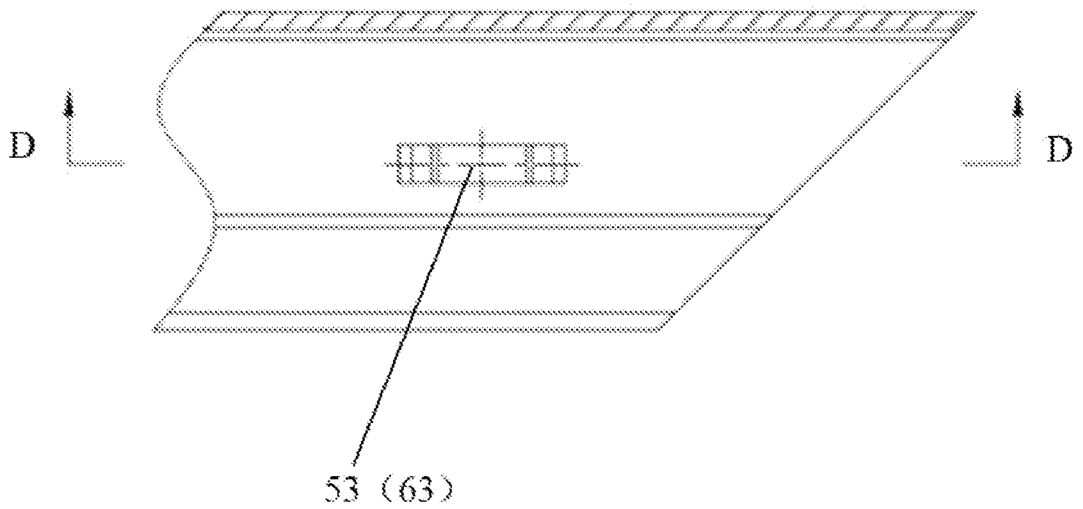
FIG. 8 is a C-C section view in FIG. 6 and FIG. 7.
Figure 9:
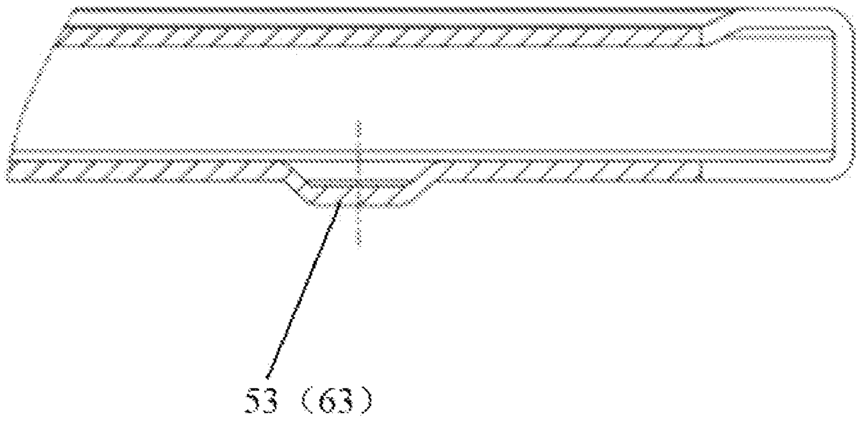
FIG. 9 is a D-D section view in FIG. 8.
Figure 10:
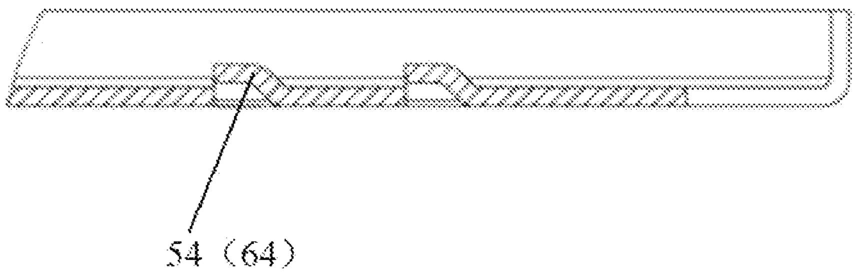
FIG. 10 is an E-E section view in FIG. 6 and FIG. 7.
Figure 11:
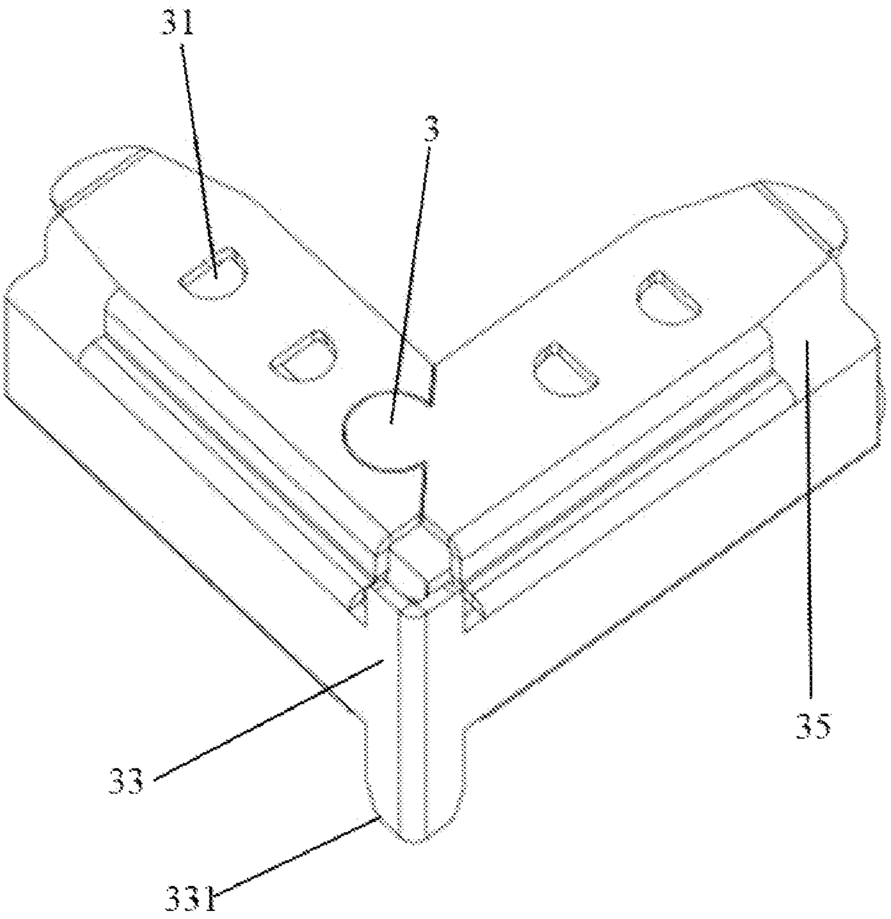
FIG. 11 is a structure schematic diagram I of an angle code in the present disclosure.
Figure 12:
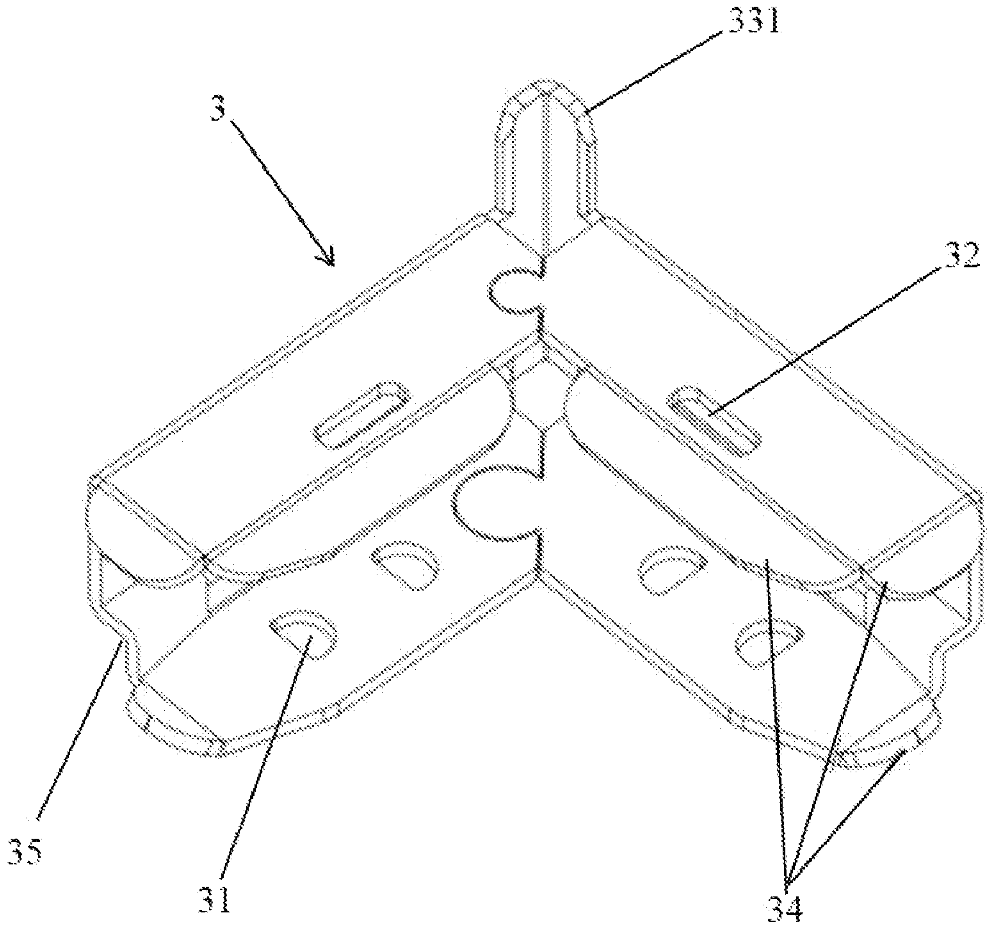
FIG. 12 is a structure schematic diagram II of an angle code in the present disclosure.
Figure 13:
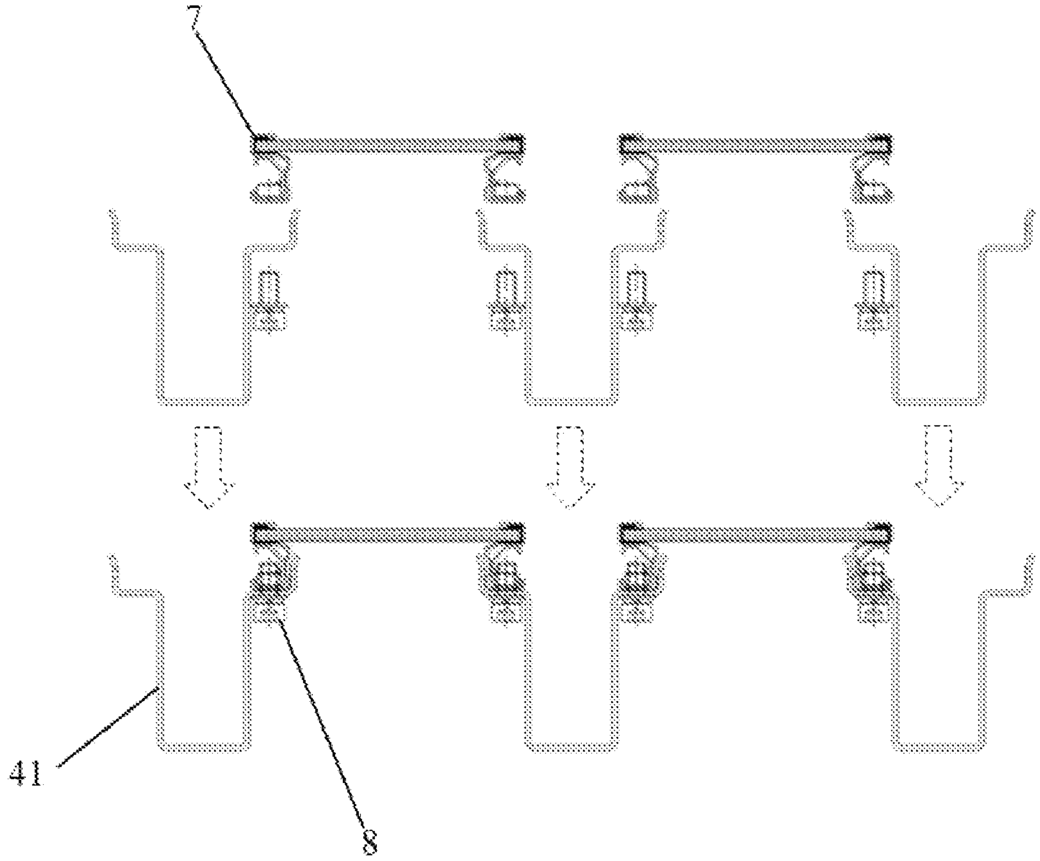
FIG. 13 is a connecting schematic diagram I of a steel frame assembly and an U-shaped purline in the present disclosure.
Figure 14:
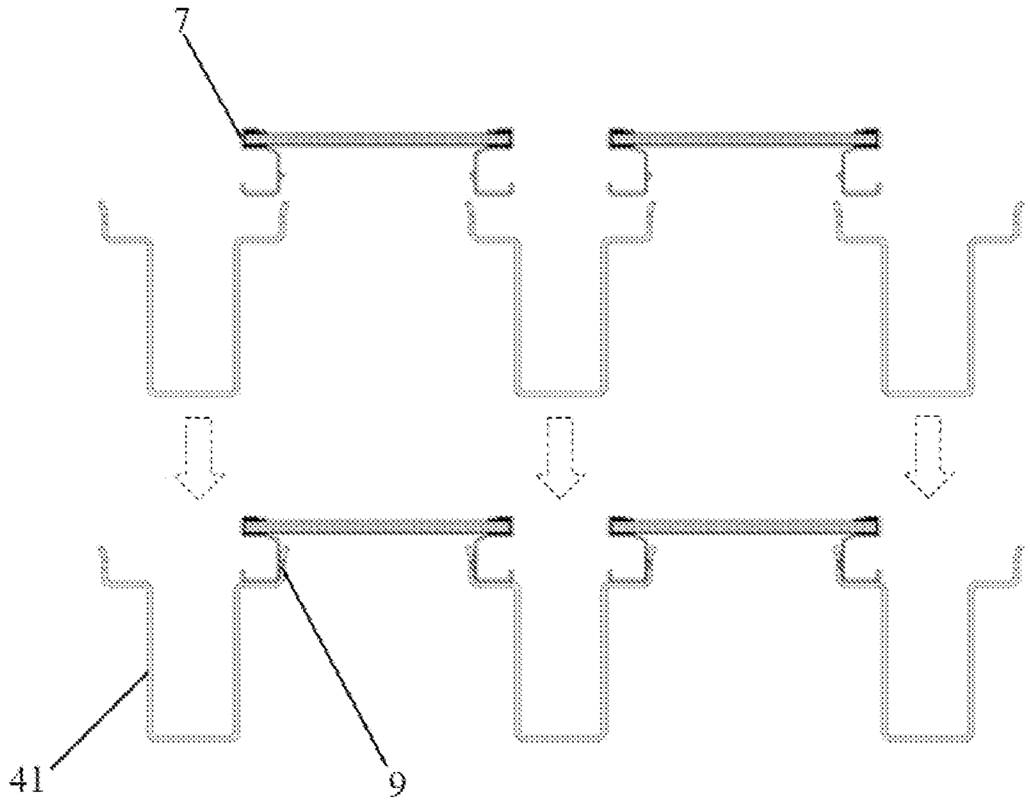
FIG. 14 is a connecting schematic diagram II of a steel frame assembly and an U-shaped purline in the present disclosure.

Referring to FIG. 1, FIG. 13 and FIG. 14, an integrated structure of a steel frame assembly and a steel support for a solar photovoltaic power station, including long-side steel frames 1, short-side steel frames 2, angle codes 3 and purlines 4 that fit with each other, where the long-side steel frames 1 and the short-side steel frames 2 are separately connected with two perpendicular portions of the angle codes 3 to form steel frame assemblies 7, connecting portions thereof are of the same structures, and the steel frame assemblies 7 are connected with the purlines 4 again, Referring to FIG. 1, steel frames located at the lowermost positions of the steel frame assemblies 7 are set as steel frames I 5 without sides A, the remaining steel frames are all steel sides II 6 with sides A, and the steel frame assemblies 7 are connected with the purlines 4 in a back locking or pressing block fixation manner;

Referring to FIG. 1, FIG. 2, FIG. 4 and FIG. 6, the steel frames I 5 include frames constituting a lower-end cavity I 51 and a vertical extension edge 52 at an upper part thereof, a zero-gap folding edge I 521 is arranged on the vertical extension edge 52, a laminating piece is arranged at an L-shaped mounting position formed by one side of the vertical extension edge 52 and the lower-end cavity I 51, the vertical extension edge 52 is as high as the laminating piece, such that the surface of the photovoltaic module is not easy to accumulate dust and store water, to improve the power generation capacity;

an upper frame inside the lower-end cavity I 51 is provided with an anti-rotating bump I 53, and a lower frame inside the lower-end cavity I 51 is provided with D-shaped riveting points I 54;

Referring to FIG. 1, FIG. 3, FIG. 5 and FIG. 7, cross sections of the steel frames II 6 are S-shaped, the steel frames II 6 include frames constituting an upper-end cavity 61 and a lower-end cavity II 62, the inside of the upper-end cavity 61 is used for mounting the laminating piece, the lower-end cavity 62 is used for mounting and connecting angle codes, elastic pressing blocks, edge pressing blocks, middle pressing blocks and other accessories, a side-A frame 611 at the upper part of the upper-end cavity 61 is provided with a zero-gap folding edge II 612, an upper frame inside the lower-end cavity II 62 is provided with an anti-rotating bump II 63, a lower frame inside the lower-end cavity II 62 is provided with D-shaped riveting points II 64, and a cold bend roll forming process is adopted for the cross sections of the steel frames, with the advantages of quick production speed, energy conservation and environment protection, etc.

a junction of the frame where the upper-end cavity 61 is located and the frame where the lower-end cavity II 62 is located is provided with a glue overflow groove edge 65 adopting a chamfer structure design, and the glue overflow groove edge 65 is used for glue overflow when the laminating piece is mounted;

a circular arc structure design is adopted between the folding edge I 521 and the vertical extension edge 52 as well as between the folding edge II 612 and the side-A frame 611, and a glue overflow groove chamfer design is added, which is conductive to not damaging the laminating piece easily during mounting;

Referring to FIG. 8 to FIG. 12, D-shaped holes 31 and anti-rotating bump slots 32 are formed in the angle codes 3, the D-shaped holes 31 are in mutual fit and fixed connection with the D-shaped riveting points I 54 or the D-shaped riveting points II 64 in respective while the anti-rotating bump slots 32 are in mutual fit and fixed connection with the anti-rotating bump I 53 or the anti-rotating bump II 63 in respective, the angle codes 3 are also provided with angle protectors 33 on which chamfers 331 are arranged, 45 degrees of bevel angle of the steel frame is relatively sharp and easy to scratch, so the angle protector can wrap sharp corners to play a role in protecting personnel and frames. When the steel frames are mounted, the chamfers 331 on the angle protectors 33 can ensure that no interference occurs, such that the steel frames are mounted in place, to effectively reduce the mounting precision and improve the mounting efficiency and the error-tolerant rate; and strip holes are punched above the angle codes 3 by adopting a punch forming process, and when the steel frames and the angle codes are mounted, the strip anti-rotating bumps on the steel frames enter the strip holes in the angle codes. When subjected to an external force, the angle codes are not easy to overturn and always bounded in the steel frame cavity.

Both sides of the angle codes 3 are provided with guide folding edges I 34 with rounded corners, a guide slot recession 35 is arranged between the angle codes that are located on a same side and vertically connected up and down, and rounded corners are punched on circular arc edges of the D-shaped holes 31 such that the D-shaped riveting points can enter the D-shaped holes of the angle codes smoothly, to ensure that the angle codes can be mounted in the steel frame cavity smoothly, effectively reduce the mounting precision, and improve the mounting efficiency and the error-tolerant rate; and in this present disclosure, 45 degrees of bevel angles are punched on both sides of the steel frames by adopting the punch forming process, such that the long-side steel frames 1 can be in seamless connection with the short-side steel frames 2, the D-shaped riveting points are punched on both sides of C faces of the steel frames by adopting the punch forming process, the D-shaped riveting points on the steel frames enter the D-shaped holes 31 in the angle codes 3 during mounting, that is, the connection of the long frames and the short frames may be achieved. When entering the angle code holes, the steel frame riveting points enter from the circular arc faces, and when pulled by the external force, two facades are in contact. Therefore, the riveting point connection mode has the advantages of being quick and labor-saving during mounting and strong resistance during pulling. Strip bumps are punched below the laminating piece cavity by adopting the punch forming process, when the steel frames are connected with the angle codes, the bumps enter the strip holes above the angle codes, such that the angle codes will not overturn when stressed, to increase the connecting stability. Strip mounting holes are punched in the C faces of the steel frames by adopting the punch forming process, and the strip mounting holes cooperate with the elastic pressing blocks and the three-in-one bolts for the back locking of the photovoltaic modules on the purlines.

In this embodiment, the angle codes 3 are 90 degrees of L-shaped structures, two right-angle sides are separately inserted into the long-side steel frames 1 and the short-side steel frames 2 to play a continuous role, the punch forming process is adopted for the main structures of the angle codes 3, and the two right-angle sides are connected through a rounded buckle and not easy to open when subjected to the external force;

In this device, the connection mode for the steel frames and the angle codes 3 is riveting, and the two right-angle sides of the L-shaped angle codes are separately connected with the long sides and the short sides of the steel frames. In a plant, the angle codes are mounted on both sides of the short frames in advance, and the long frames and the short frames with the angle codes are assembled together in a photovoltaic module plant. The specific mounting process is as follows:

When the steel frames are assembled with the angle codes, the right-angle sides of the angle codes 3 are only inserted into the cavities of the steel frames, and the steel frames press the D-shaped riveting points into the D-shaped holes 31 of the angle codes 3 along the guide slots in the angle codes 3. When the steel frames are assembled with the angle codes 3, one D-shaped riveting point is pushed into the D-shaped holes 31 first, then another D-shaped riveting point is pushed into the D-shaped holes 31, the fitting face is a circular arc face when entry, so the assembly is relatively easy, and the assembly in place is easily achieved with a little force. However, the reverse pulling is very difficult, since two D-shaped riveting points resist simultaneously in the D-shaped holes and the resisting plane is the facade, the angle codes are not easy to fall, firm and reliable.

If the steel frames are in riveting point fit with the angle codes purely, the angle codes are easy to shake, and the angle codes may turn over and break away from the steel steel cavities when stressed. Therefore, the anti-rotating strip buckle design is adopted above the steel frames and the angle codes. The strip anti-rotating bumps I or II are circular smooth along the mounting direction of the angle codes, and the face preventing overturning is vertical, to ensure the convenient mounting while ensuring to prevent the angle codes turning over.

Figure 15:
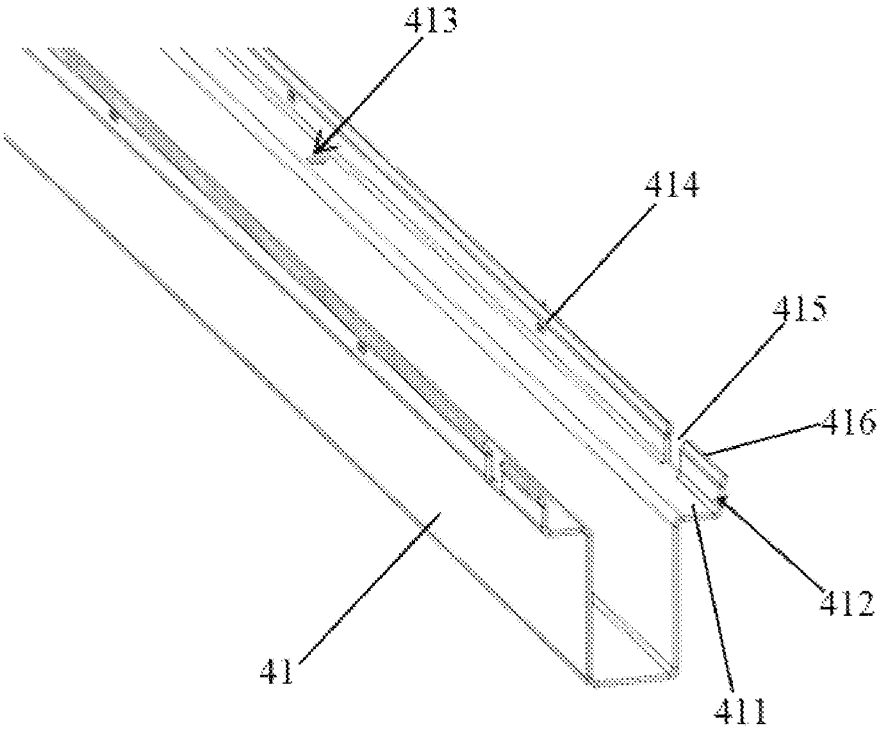
FIG. 15 is a structure schematic diagram of an U-shaped purline in the present disclosure.
Figure 16:
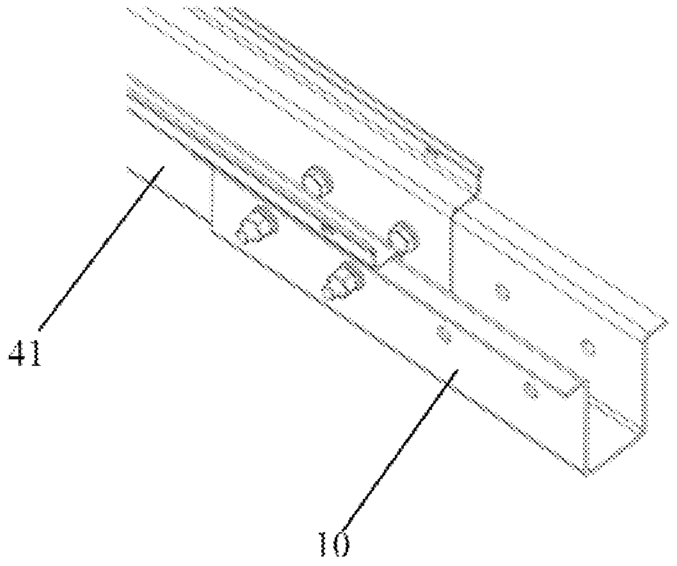
FIG. 16 is a fit schematic diagram of a purline and a purline connector in the present disclosure.
Figure 17:
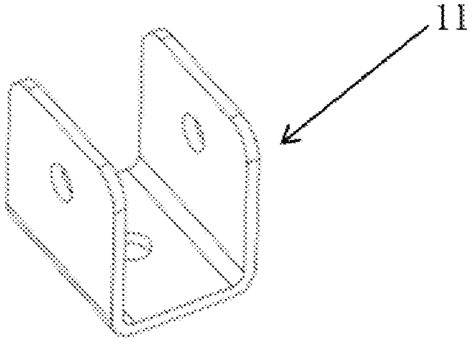
FIG. 17 is a structure diagram of an U-shaped purline holder in the present disclosure.
Figure 18:
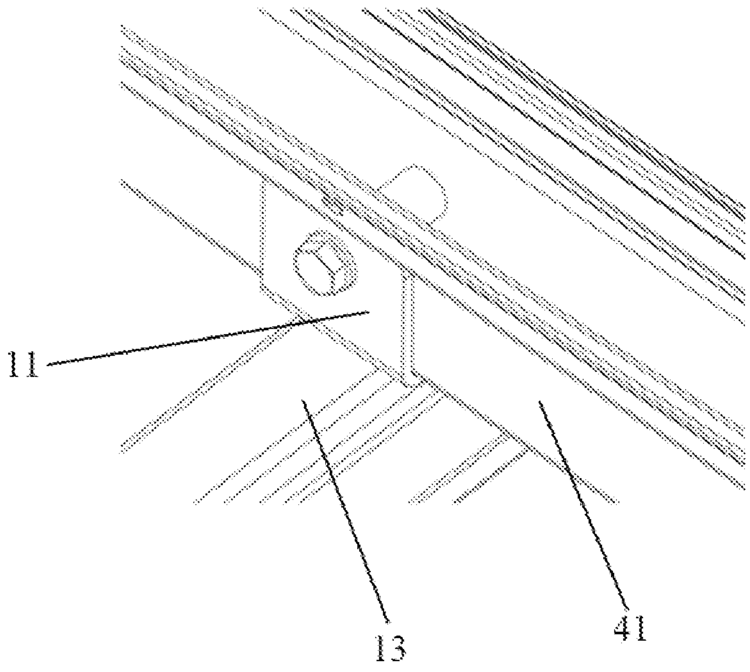
FIG. 18 is an assembly schematic diagram of a purline, a purline holder and an inclined beam in the present disclosure.
Figure 19:
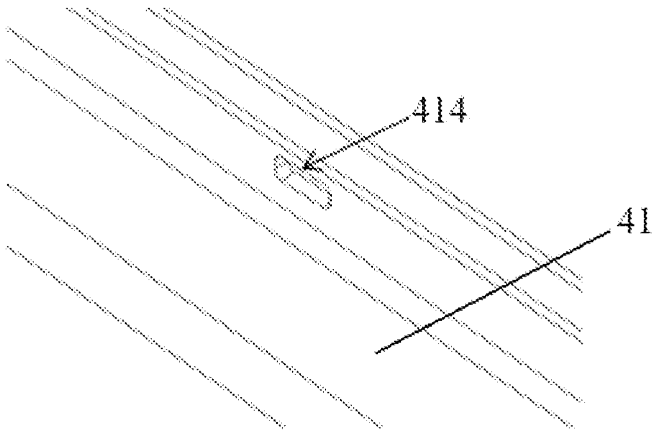
FIG. 19 is a structure schematic diagram of a boss of a steel frame assembly in the present disclosure.
Figure 20:
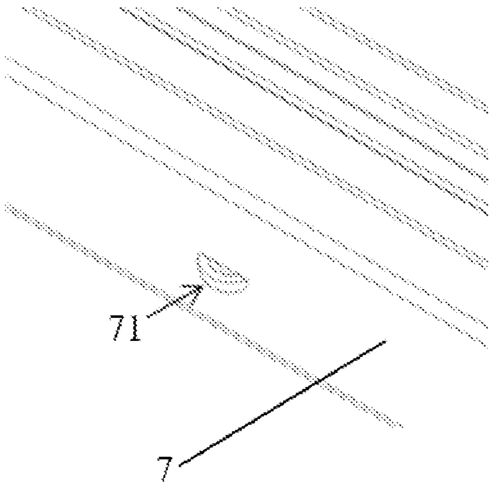
FIG. 20 is a structure schematic diagram of a groove of an U-shaped purline in the present disclosure.

Referring to FIG. 15, FIG. 19 and FIG. 20, the purlines 4 are U-shaped purlines 41, both sides of upper parts of the U-shaped purlines 41 are separately provided with horizontal bending portions 411, vertical flanges 412 are connected outside the horizontal bending portions 411 on each side, the vertical flanges 412 and the horizontal bending portions 411 form an L-shaped structure that is set to be parallel to axes of the U-shaped purlines 41, mounting holes 413 are formed in the horizontal bending portions 411, grooves 414 are formed in the flanges 412, limiting gaps 415 are arranged on the flanges 412, upper parts of the flanges 412 are also provided with guide folding edges II 416 that bend outwards, when the steel frame assemblies 7 are in connection fit with the purlines 4, facades of the steel frame assemblies 7 are provided with bosses 71 fitting with the grooves 414, the bosses 71 are just embedded into the grooves 414, and the steel frame assemblies 7 are clamped at the limiting gaps 415 to limit the displacement of the steel frame photovoltaic module and to ensure the steel frame photovoltaic module not to fall easily.

In this present disclosure, referring to FIG. 13 and FIG. 14, the connecting mode for the steel frame photovoltaic modules and the U-shaped purlines 41 includes a bolt 8 connection, a buckle 9 type connection and a bolt+buckle connection:

a) if the facades of the steel frame assemblies 7 have ribs, the bolt connection is adopted; the upper parts of the U-shaped purlines 41 are tapped, elastic pressing blocks are provided in the mounting cavities of the steel frame assemblies 7, such that flat gaskets and elastic gaskets are integrated on the bolts without falling, and then the steel frame assemblies 7 are locked with the U-shaped purlines 41;
b) If the facades of the steel frame assemblies 7 have no ribs, the buckle 9 type connection is adopted; the bosses 71 are punched on the facades of the steel frame assemblies 7, the grooves 414 are punched on the flanges of the U-shaped purlines 41, and during mounting, the bosses 71 on the steel frame assemblies 7 enter the grooves 414 of the U-shaped purlines 41, to achieve the bolt-free connection; and
c) the double-connection guarantee of the steel frame photovoltaic modules and the U-shaped purlines is achieved by combining modes a and b.

The mounting mode is not only suitable for artificial mounting, but also suitable for the robot automatic mounting. The solution can achieve functions of accurate positioning for the steel frame assemblies, preventing the steel frame assemblies from sliding due to dead load, and preventing the steel frame assemblies being blown off in a working condition against the wind. The solution can reduce the mounting personnel, reduce the labor intensities of mounting personnel and greatly improve the mounting efficiency.

Embodiment 2

Figure 21:
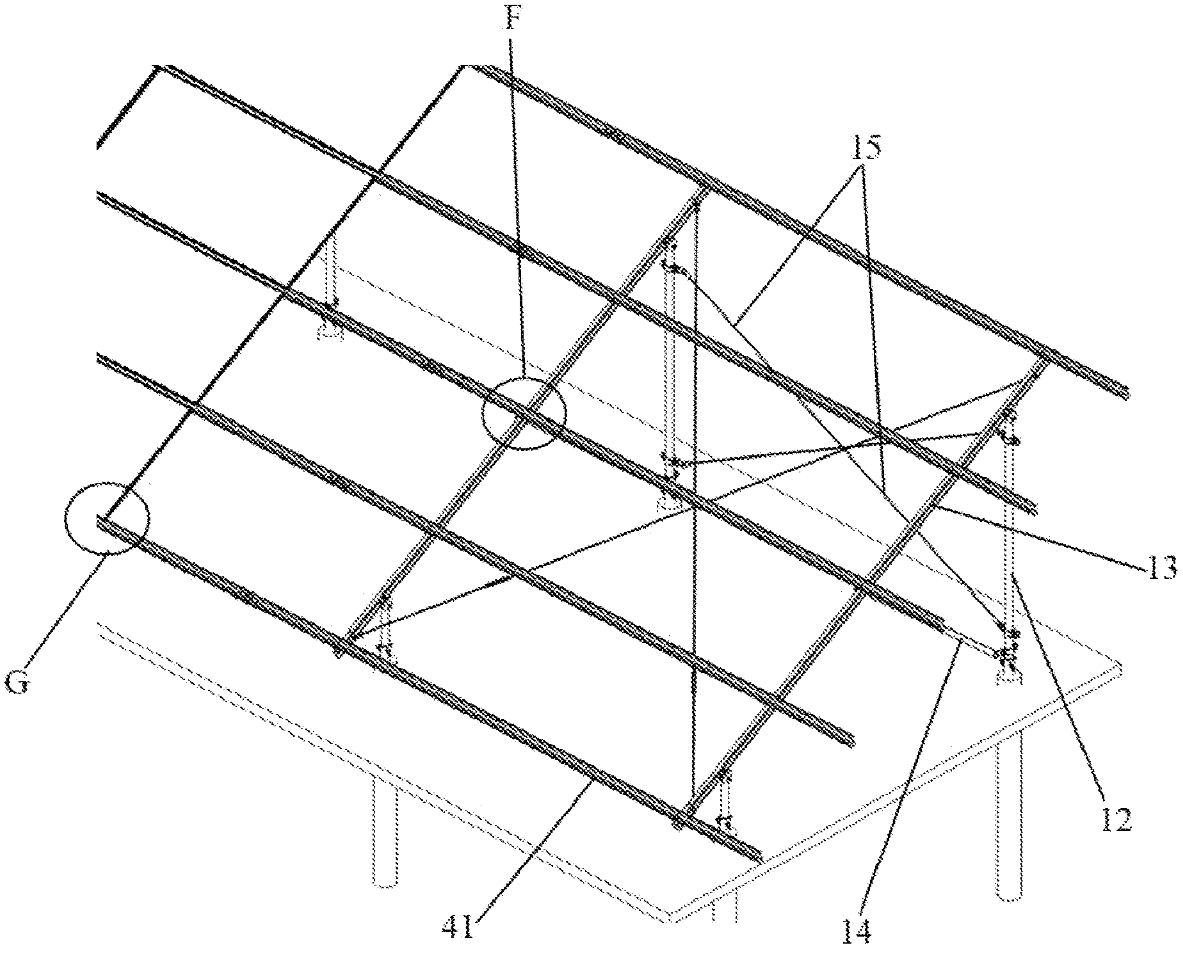
FIG. 21 is a schematic diagram of a horizontal mounting structure for a steel frame photovoltaic module in the present disclosure.
Figure 22:
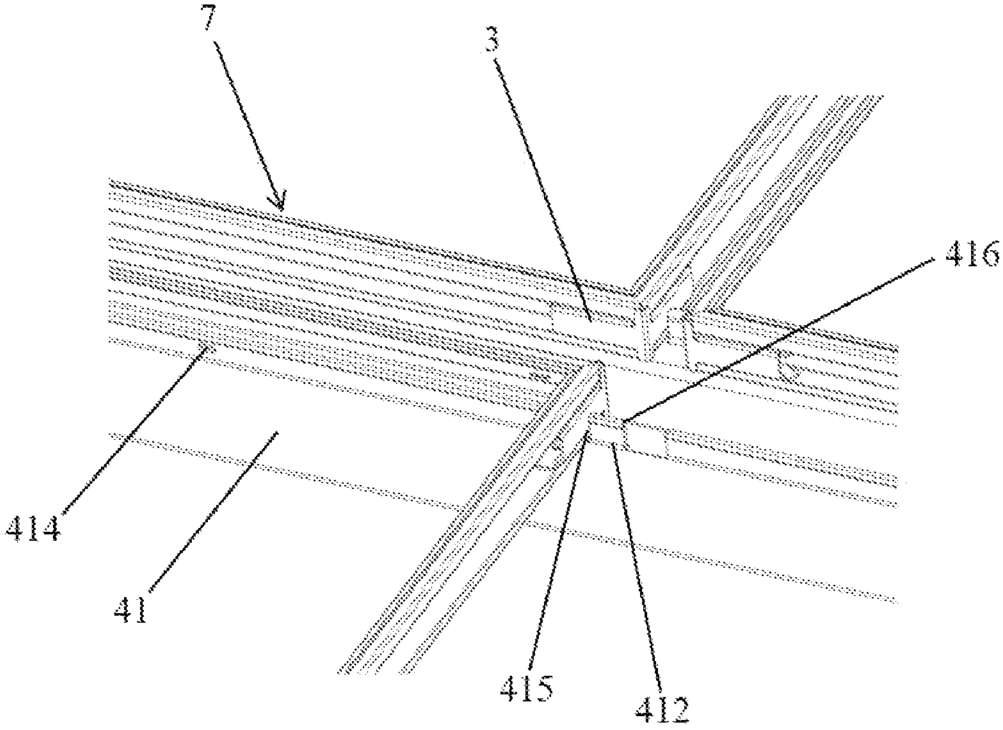
FIG. 22 is an assembly schematic diagram of a steel frame assembly and an U-shaped purline at F in FIG. 21.
Figure 23:
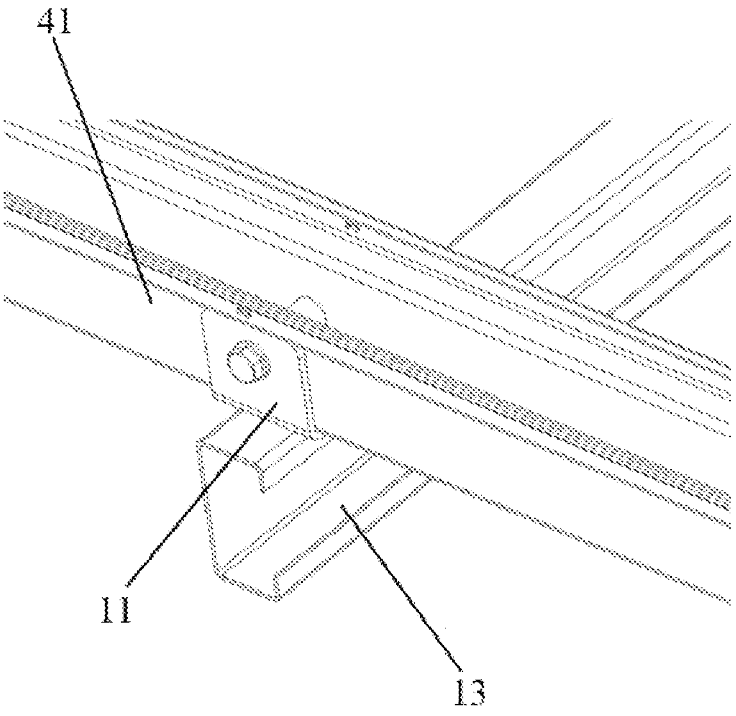
FIG. 23 is an assembly schematic diagram of an U-shaped purline and an inclined beam at G in FIG. 21.
Figure 24:
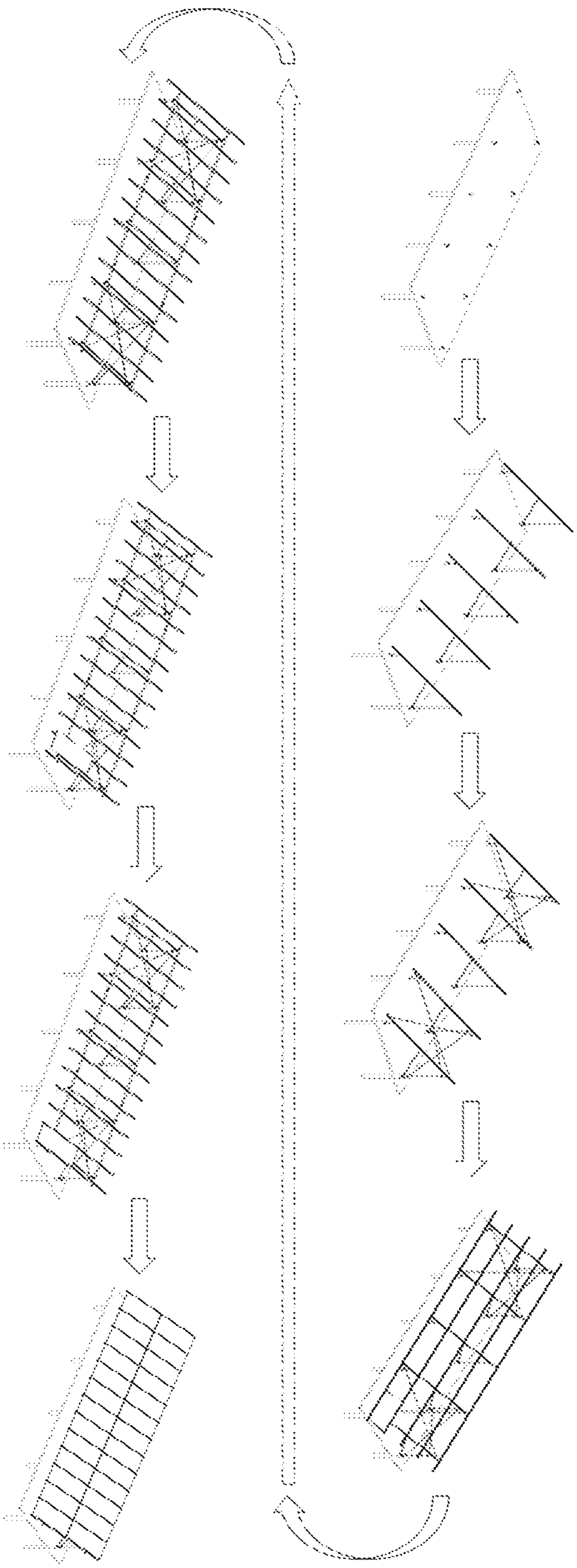
FIG. 24 is a horizontal mounting step diagram for a steel frame support for a solar photovoltaic power station in the present disclosure.

In Embodiment 1, an assembling method for the steel frame photovoltaic modules and the U-shaped purlines includes a horizontal row mounting method and a vertical row mounting method, and referring to FIG. 24, the horizontal row mounting method includes:

(1) Mounting a photovoltaic support foundation based on a north-south span and a west-east span between foundations on a design drawing;
(2) Setting up columns 12, inclined beams 13 and inclined struts 14 on the photovoltaic support foundation, and performing a height regulation on the columns 12 in a ground pile, whereby upper surfaces of the inclined beams 13 are located on a same horizontal plane;
(3) Mounting inclined cross adjustable pull rods 15 between the inclined beams 13 and between the columns 12;
(4) Transversely setting up U-shaped purlines 41 on the inclined beams 13, to ensure the space between the purlines 41, and connecting the purlines through purline connectors 10 when an array is relatively long;
(5) Lifting, by constructors, a steel frame photovoltaic module to a designated position above the U-shaped purlines 41, or absorbing, by a robot, outer frames of steel frame assemblies 7 through an electromagnetic chuck, and lifting to the designated position above the U-shaped purlines 41;

(6) Pressing the steel frame photovoltaic module forcibly, clamping bosses 71 on facades of the steel frame assemblies 7 into grooves 414 in the U-shaped purlines 41 until a bottom surface of the steel frame photovoltaic module fits with upper surfaces of the U-shaped purlines 41, and locking the steel frame assemblies 7 with bolts when there are no bumps;

(7) Repeating the above step (6), mounting the remaining steel frame photovoltaic modules on the U-shaped purlines 41, and completing the mounting;

Specifically, referring to FIG. 21 to FIG. 23, a horizontal row mounting structure for the steel frame photovoltaic modules specifically includes:

(1) Setting up the U-shaped purlines 41 on the inclined beams 13, and transversely mounting the steel frame photovoltaic modules on the U-shaped purlines 41;

(2) Limiting, by the flanges on the upper and lower U-shaped purlines 41, the movement of the steel frame assemblies 7 in a y-axis direction, that is, the short-side direction;

(3) Punching the gaps 415 at the interference of the flanges 412 of the U-shaped purlines 41 and the steel frame assemblies 7, and limiting, by the gaps 415, the movement of the steel frame assemblies 7 in an x-axis direction, that is, the long-side direction; and (4) Punching the grooves 414 on the flanges 412 of the U-shaped purlines 41, punching the bosses 71 inside the facades of the steel frame assemblies 7, the bosses 71 entering the grooves 414 after the steel frame assemblies 7 are mounted, to limit the movement of the steel frame assemblies 7 in a z-axis direction, that is, the direction perpendicular to the steel frame photovoltaic modules.

Embodiment 3

Figure 25:
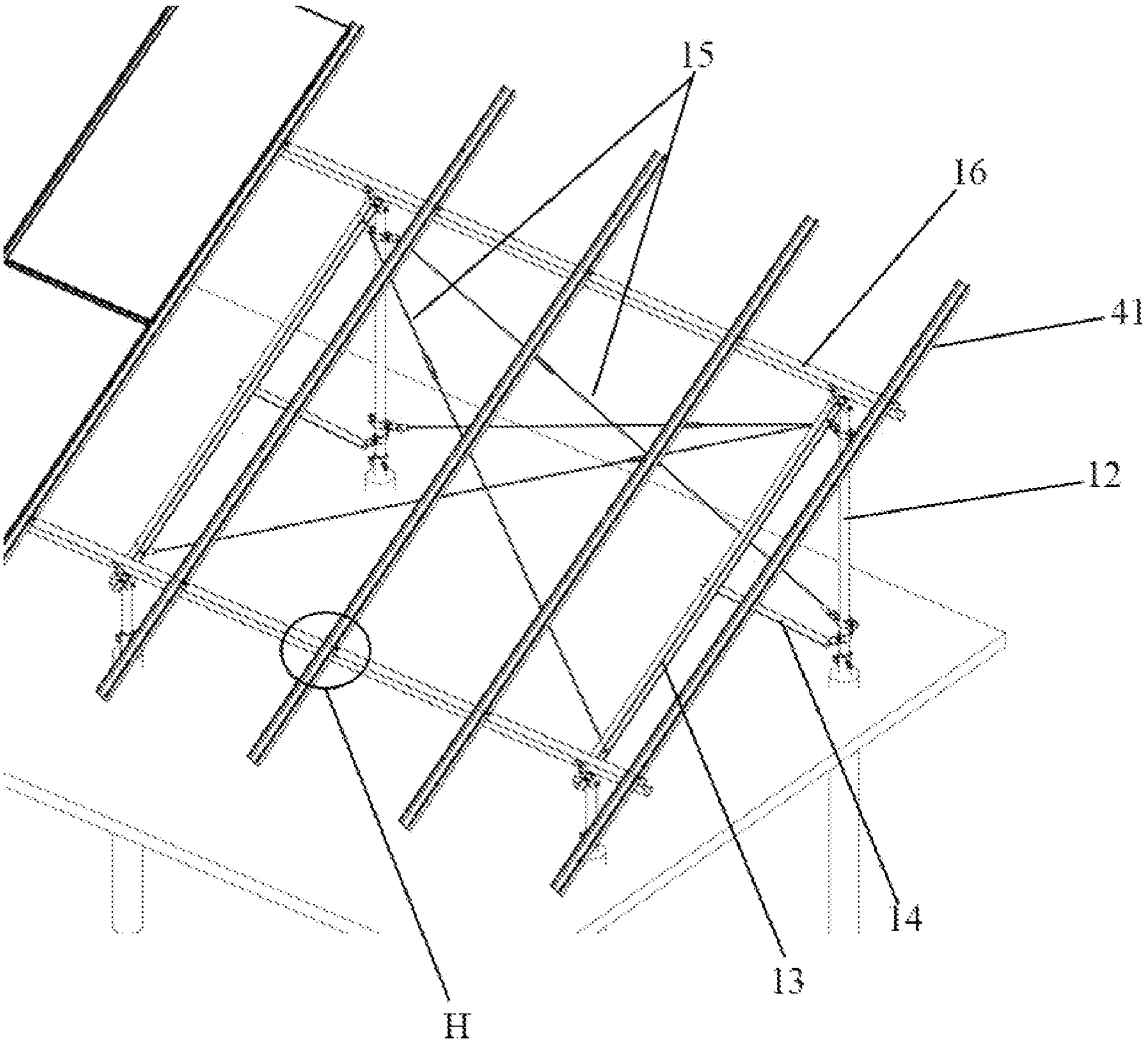
FIG. 25 is a vertical mounting structure diagram for a steel frame photovoltaic module in the present disclosure.
Figure 26:
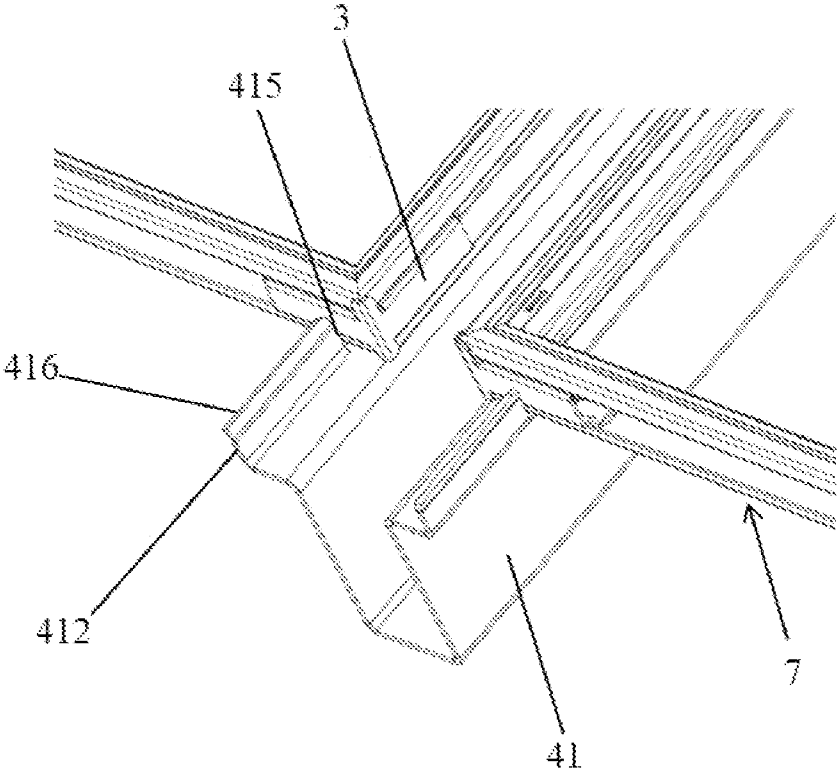
FIG. 26 is an assembly schematic diagram of a steel frame assembly and an U-shaped purline at H in FIG. 25.
Figure 27:
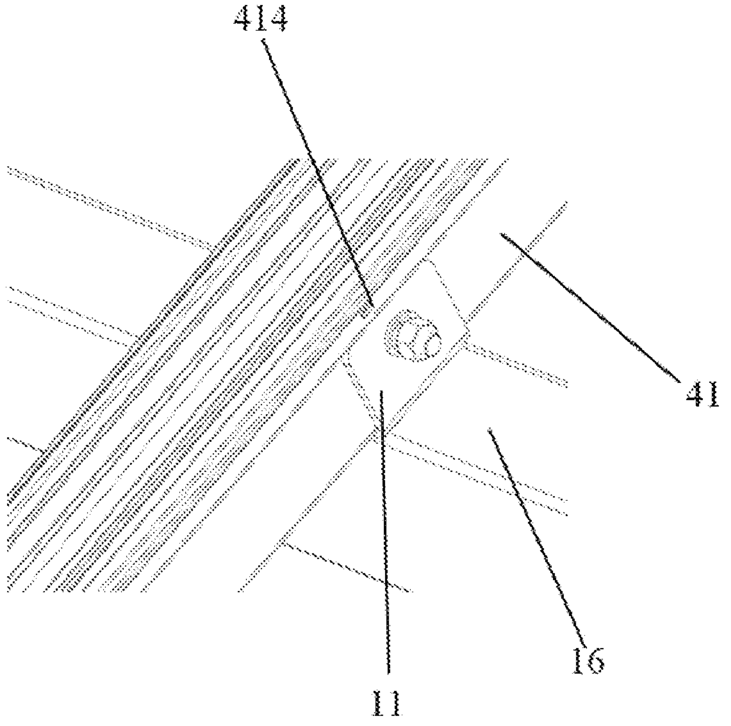
FIG. 27 is an assembly schematic diagram of an U-shaped purline and a beam at H in FIG. 25.
Figure 28:
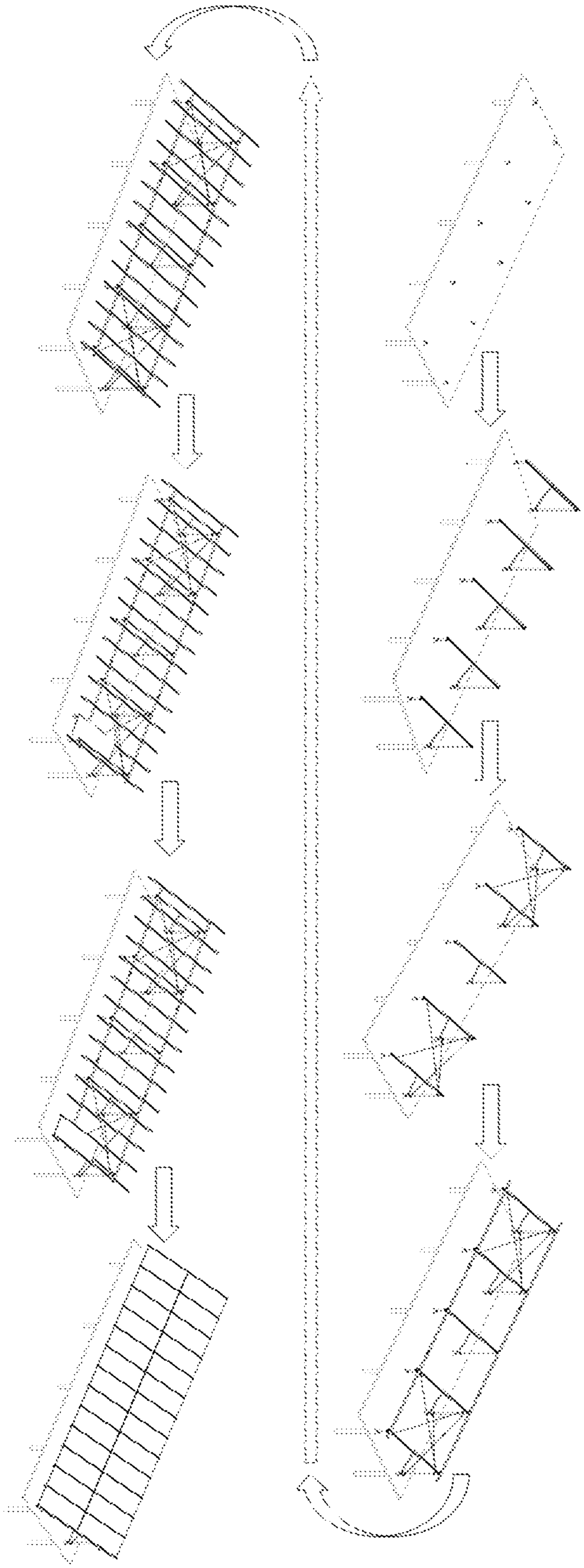
FIG. 28 is a vertical mounting step diagram for a steel frame support for a solar photovoltaic power station in the present disclosure.

In Embodiment 1, an assembling method for the steel frame photovoltaic modules and the U-shaped purlines includes a horizontal row mounting method and a vertical row mounting method, and referring to FIG. 28, the vertical row mounting method includes:

(1) Mounting a photovoltaic support foundation based on a north-south span and a west-east span between foundations on a design drawing;

(2) Setting up columns 12, inclined beams 13 and inclined struts 14 on the photovoltaic support foundation, and performing a height regulation on the columns 12 in a ground pile, whereby upper surfaces of the inclined beams 13 are located on a same horizontal plane;

(3) Mounting inclined cross adjustable pull rods 15 between the inclined beams 13 and between the columns 12;

(4) Setting up two beams 16 on the inclined beams 13, and connecting the beams through a beam connector when an array is relatively long;

(5) Vertically setting up the U-shaped purlines 41 above the beams 16, to ensure the space between the U-shaped purlines 41;

(6) Lifting, by constructors, a steel frame photovoltaic module to a designated position above the U-shaped purlines 41, or absorbing, by a robot, outer frames of steel frame assemblies 7 through an electromagnetic chuck, and lifting to the designated position above the U-shaped purlines 41;

(7) Pressing the steel frame photovoltaic module forcibly, clamping bosses 71 on facades of the steel frame assemblies 7 into grooves 414 in the U-shaped purlines 41 until a bottom surface of the steel frame photovoltaic module fits with upper surfaces of the U-shaped purlines 41, and locking the steel frame assemblies 7 with bolts when there are no bumps;

(8) Repeating the above step (7), mounting the remaining steel frame photovoltaic modules on the U-shaped purlines 41, and completing the mounting;

Specifically, referring to FIG. 25 to FIG. 27, a vertical row mounting structure for the steel frame photovoltaic modules specifically includes:

(1) Setting up the beams 16 on the inclined beams 13, setting up the U-shaped purlines 41 on the beams 16, and vertically mounting the steel frame photovoltaic modules on the U-shaped purlines 41;

(2) Limiting, by the flanges 412 on the left and right U-shaped purlines 41, the movement of the steel frame assemblies 7 in an x-axis direction, that is, the short-side direction;

(3) Punching the gaps 415 at the interference of the flanges 412 of the U-shaped purlines 41 and the steel frame assemblies 7, and limiting, by the gaps 415, the movement of the steel frame assemblies 7 in a y-axis direction, that is, the long-side direction; and (4) Punching the grooves 414 on the flanges 412 of the U-shaped purlines 41, punching the bosses 71 inside the facades of the steel frame assemblies 7, the bosses 71 entering the grooves 414 after the steel frame assemblies 7 are mounted, to limit the movement of the steel frame assemblies 7 in a z-axis direction, that is, the direction perpendicular to the steel frame photovoltaic modules.

After the steel frame photovoltaic modules are mounted, the U-shaped purlines 41 can limit the steel frame assemblies 7 in three directions of x-axis, y-axis and z-axis, such that the steel frame assemblies 7 will not slide in a working condition of dead load and not be blown off in a working condition against the wind.

The assembly for the purline connectors 10, the U-shaped purline holders 11, the U-shaped purlines 41 and the inclined beams 13 is as shown in FIG. 16 to FIG. 18, FIG. 23 and FIG. 27, and the assembly for clamping the grooves 414 and the bosses 71 and limiting the steel frames and the U-shaped purlines 41 is as shown in FIG. 19, FIG. 20, FIG. 22 and FIG. 26.

The present disclosure has a high mounting efficiency: the traditional mounting mode needs two mounting personnel to hold the photovoltaic modules with hands and one person to lock the bolts. The traditional mounting mode not only needs more mounting personnel, but also consumes labor, with a great labor intensity. In the solution of the present disclosure, both the horizontal row and the vertical row need two mounting personnel only, with a simple and convenient mounting process, to achieve the bolt-free locking, greatly improve the mounting efficiency and reduce the labor intensity of the mounting personnel.

The present disclosure may achieve the automatic mounting: in this solution, the robot adopts the electromagnetic chuck to absorb the outer frames of the steel frame assemblies, and visual positioning is performed through the flanges on the U-shaped purlines and the gaps, such that the photovoltaic modules are accurately positioned above the U-shaped purlines. The robot presses the steel frame assemblies with a less force, such tat the bosses on the steel frame assemblies enter into grooves in the U-shaped purlines, and the mounting is completed when bottom surfaces of the steel frame photovoltaic modules fit with upper surfaces of the purlines. The mounting mode may achieve the bolt-free locking, and is very suitable for robot quick mounting, to greatly improve the mounting efficiency.

The present disclosure has a high strength, and the reliability is guaranteed: in the traditional mounting mode, mounting holes need to be punched in the assembly frame, the mounting holes will weaken the frame strength and this part has the greatest stress, the mounting holes have a risk of being torn in storm wind, this mounting mode does not need the bolts for locking, so the mounting holes may not be punched in the steel frames, the strength of the photovoltaic module is further improved, and the reliability is more strongly guaranteed. In the working conditions of downwind and sown, the steel frame assembly of both the horizontal row and the vertical row has a long side that is fully constrained, and in the working condition against the wind, a plurality of boss constraints are on the steel frame, and compared with the traditional four-point constraint, the safety is greatly improved.

The present disclosure solves the drawback when mounting the bolts: solve the problem that the bolts are easy to fall, leak and not locked in place during mounting, and solve the risk that the nuts will be loosened when the photovoltaic module is subjected to dynamic load. This solution can save the cost of the bolts and other fasteners, meanwhile this solution is maintenance-free in the later period, and the inspection and maintenance for the bolts fastening the photovoltaic module are not required regularly.

The present disclosure has a high anti-corrosion property: both the steel frames and the purlines are processed by galvanized aluminum magnesium high-strength steel sheets, the material is not subjected to hot-galvanizing treatment, so the material is environment-friendly and pollution-free, with super-strong outdoor corrosion resistance. In addition, the steel frames and purlines are the same metal, without occurring an electrochemical corrosion.

In addition to the above embodiments, the present disclosure may have other implementations. All technical solutions formed by equal replacement or equivalent transformation all fall into the protective scope of the present disclosure.

What is claimed is:

1. An integrated structure of a steel frame assembly and a steel support for being installed at a solar photovoltaic power station, comprising long-side steel frames, short-side steel frames, corner brackets and purlins that fit with each other, wherein the long-side steel frames and the short-side steel frames are separately connected with two perpendicular portions of the corner brackets to form the steel frame assembly, wherein the steel frame assembly is connected with the purlins, wherein a first steel frame is one of the long-side steel frames and the short-side steel frames and configured for being located at a lowermost position of the steel frame assembly when installed at the solar photovoltaic power station, wherein remaining long-side and short-side steel frames are second steel frames, and wherein the steel frame assembly is connected with the purlins;

the first steel frame comprises a first lower-end cavity and a vertical extension edge at an upper part thereof, a first zero-gap folding edge flange is arranged on the vertical extension edge, wherein one side of the vertical extension edge and the first lower-end cavity form a mounting position for a laminating piece, wherein the mounting position has an L-shaped cross section, the vertical extension edge is as high as the laminating piece, an upper frame element inside the first lower-end cavity is provided with a first anti-rotating bump, and a lower frame element inside the first lower-end cavity is provided with D-shaped first riveting points; and cross sections of the second steel frames are S-shaped, the second steel frames have an upper-end cavity and a second lower-end cavity, the second steel frame at an upper part of the upper-end cavity is provided with a second zero-gap folding edge flange, an upper frame element inside the second lower-end cavity is provided with a second anti-rotating bump, and a lower frame element inside the second lower-end cavity is provided with D-shaped second riveting points.

2. The integrated structure of the steel frame assembly and the steel support for the solar photovoltaic power station according to claim 1, wherein a chamfered junction of the upper-end cavity and the second lower-end cavity is a glue overflow groove edge, and a first circular arc structure connects the first zero-gap folding edge flange and the vertical extension edge, and a second circular arc structure connects the second zero-gap folding edge flange and the upper part of the upper-end cavity.

3. The integrated structure of the steel frame assembly and the steel support for the solar photovoltaic power station according to claim 2, wherein holes, having a D-shaped cross section, and anti-rotating bump slots are formed in the corner brackets, the holes are in mutual fit and fixed connection with the D-shaped first riveting points or the D-shaped second riveting points, respectively, while the anti-rotating bump slots are in mutual fit and fixed connection with the first anti-rotating bump or the second anti-rotating bump, respectively, the corner brackets are also provided with chamfered corner protectors, both sides of the corner brackets are provided with guide folding edges with rounded corners and guide slot recessions.

4. The integrated structure of the steel frame assembly and the steel support for the solar photovoltaic power station according to claim 2, wherein the purlins are U-shaped purlins, both sides of upper parts of the U-shaped purlins are separately provided with horizontal bending portions, vertical flanges are connected outside the horizontal bending portions on each side, the vertical flanges and the horizontal bending portions form an L-shaped structure that is set to be parallel to axes of the U-shaped purlins, mounting holes are formed in the horizontal bending portions, grooves are formed in the flanges, limiting gaps are arranged on the flanges, upper parts of the flanges are also provided with guide folding edges that bend outwards, when the steel frame assembly is in connection fit with the U-shaped purlins, vertical surface of the steel frame assemblies are provided with bosses fitting with the grooves, and the steel frame assembly is clamped at the limiting gaps.

* * * * *